Nov. 4, 1930.   A. E. ANDERSON   1,780,664
CONTROL SYSTEM
Filed Jan. 14, 1927
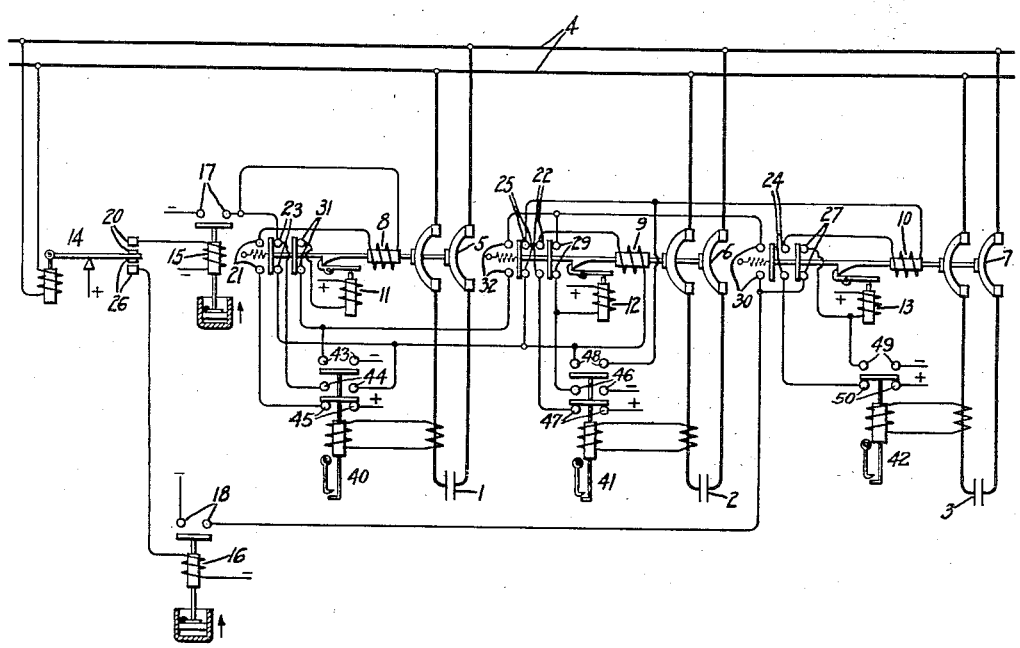
Inventor:
Arvid E. Anderson,
by
His Attorney.

Patented Nov. 4, 1930

1,780,664

UNITED STATES PATENT OFFICE

ARVID E. ANDERSON, OF SCOTIA, NEW YORK, ASSIGNOR TO GENERAL ELECTRIC COMPANY, A CORPORATION OF NEW YORK

CONTROL SYSTEM

Application filed January 14, 1927. Serial No. 161,192.

My invention relates to control systems and particularly to a system for controlling the connections of capacitors to an electric circuit and its object is to provide an automatic control arrangement for controlling the connections between an alternating current circuit and a plurality of capacitors in response to predetermined electrical conditions of the circuit.

In systems of alternating current distribution which supply inductive loads, the power factor and voltage of the system can be materially improved by connecting capacitors of the proper number and size to the system so that the leading currents taken by capacitors compensate for the lagging current of the load. In accordance with my invention I provide an arrangement for automatically connecting a plurality of capacitors to the system in a predetermined sequence and for automatically disconnecting the capacitors from the system in a predetermined sequence in response to predetermined electrical conditions of the system such as predetermined power factors or voltages.

My invention will be better understood from the following description taken in connection with the accompanying drawing and its scope will be pointed out in the appended claims.

Referring to the accompanying drawing which diagrammatically shows a control system embodying my invention, 1, 2, and 3 represent a plurality of capacitors which are adapted to be connected to an alternating current circuit 4 by means of the circuit breakers 5, 6, and 7 respectively. These circuit breakers 5, 6, and 7 may be of any suitable type examples of which are well known in the art. As shown in the drawing the circuit breakers 5, 6, and 7 are of the well known latched-in type and are respectively provided with the closing coils 8, 9, and 10 and the tripping coils 11, 12, and 13.

In order to control the connections between the capacitors 1, 2, and 3 and the circuit 4 in response to a predetermined electrical condition of the circuit 4, which in the particular arrangement shown in the drawing is the voltage of the circuit 4, I provide a contact making volt-meter 14 which is connected across the circuit 4. The volt-meter 14 is arranged to effect the completion of the circuit of a time relay 15 when the voltage of the circuit 4 is below a predetermined value and the completion of the circuit of a time relay 16 when the voltage of the circuit 4 is above a predetermined value. The time relays 15 and 16 are arranged in any suitable manner so that they do not close their respective contacts until after their respective coils have been energized for a certain length of time.

In order that the capacitors 1, 2, and 3 may be successively connected to the electric circuit 4 in the order named when the voltage across the circuit 4 remains below a predetermined value, the circuit of the closing coil 8 of circuit breaker 5 is arranged to be completed when the contacts 17 of the time relay 15 are closed and the circuit breaker 5 is open, the circuit of the closing coil 9 of circuit breaker 6 is arranged to be completed when the contacts 17 of the time relay 15 are closed, the preceding circuit breaker 5 in the predetermined sequence is closed and the circuit breaker 6 is open, and the circuit of the closing coil 10 of the circuit breaker 7 is completed when contacts 17 of relay 15 are closed, the preceding circuit breakers 5 and 6 in the predetermined sequence are closed, and the circuit breaker 7 is open.

In order to effect the successive disconnection of the capacitors in the reverse order, the circuit of the tripping coil 13 of the circuit breaker 7 is arranged to be completed when all of the circuit breakers are closed and the contacts 18 of the time relay 16 are closed. The circuits of the tripping coils 12 and 11 are successively completed in response to opening of the preceding circuit breakers in the sequence when the time relay contacts 18 are closed. If desired, a predetermined time relay may be interposed between the opening and closing of successive circuit breakers in any desired manner.

For effecting the disconnection of the capacitors 1, 2, and 3 when a fault occurs therein, I provide suitable protective means such as overload relays 40, 41, and 42. The overload relay 40 is connected in any suitable manner so that it is energized in accordance with the current supplied to the capacitor 1 and operates when the current in the circuit of the capacitor 1 exceeds a predetermined value to close its contacts 43, 44 and open its contacts 45. The contacts 43 are in a circuit for the tripping coil 11 so that the circuit breaker 5 is opened. The contacts 45 are in the circuit of the closing coil 8 of the circuit breaker 5 so that the circuit breaker cannot be closed so long as the relay 40 is in its actuated position. Preferably each of the relays 40, 41, and 42 are arranged to be held in their actuated positions in any suitable manner after their respective windings are de-energized. In order to permit a subsequent circuit breaker in the predetermined sequence to be reclosed the contacts 44 are arranged in parallel with the auxiliary contacts 23 on the circuit breaker 5 so that the circuits of the closing coils 9 and 10 may be completed even though the circuit breaker 5 is not closed.

The overload relays 41 and 42 are similarly arranged so that they are energized in accordance with the currents in the circuits of the capacitors 2 and 3 respectively and operate when the currents in these respective circuits exceed predetermined values. The relay 41 by closing its contacts 46 completes the circuit of the tripping coil 12, by opening its contacts 47 opens the circuit of the closing coil 9 and by closing its contacts 48, which are in parallel with the auxiliary contacts 25, transfers the control to the next circuit breaker in the predetermined sequence the same as though the circuit breaker 6 were closed.

The relay 42 by closing its contacts 49 completes the circuit of the tripping coil 13 and by opening its contacts 50 opens the circuit of the closing coil 10. Since the circuit breaker 7 is the last breaker of the predetermined sequence, in the arrangement disclosed in the drawing, it is not necessary for the relay 42 to transfer the control to another circuit breaker.

The operation of the arrangement shown is as follows: When all of the circuit breakers are open and the voltage of the circuit 4 decreases below a predetermined value so that the relay 14 closes its contacts 20, the circuit of the time relay 15 is completed. The relay 15 closes its contacts 17 if the voltage of the circuit 4 remains below said predetermined value for a predetermined length of time. The closing of the contacts 17 of relay 15 completes a circuit for the closing coil 8 from one side of a control circuit through contacts 45 of relay 40, auxiliary contacts 21 on the circuit breaker 5, closing coil 8, contacts 17 of relay 15 to the other side of the control circuit. The closing of the circuit breaker 5 connects the capacitor 1 across the circuit 4. If the connection of the capacitor 1 does not restore the voltage of the circuit to normal so that the voltmeter 14 opens its contacts, a circuit is completed for the closing coil 9 of the circuit breaker 6 so that the capacitor 2 is also connected across the circuit 4. The circuit of the closing coil 9 is from one side of a control circuit through contacts 47 of relay 41, auxiliary contacts 22 on circuit breaker 6, closing coil 9, auxiliary contacts 23 on circuit breaker 5, contacts 17 of relay 15, to the other side of the control circuit.

If the capacitors 1 and 2 together do not take sufficient leading current to restore the voltage of the circuit 4 to normal, a circuit is completed for the closing coil 10 of the circuit breaker 7 after the circuit breaker 6 closes. This circuit is from one side of a suitable control circuit through contacts 50 of relay 42, auxiliary contacts 24 on circuit breaker 7, closing coil 10, auxiliary contacts 25 on circuit breaker 6, auxiliary contacts 23 on circuit breaker 5, contacts 17 of relay 15 to the other side of the control circuit.

When all of the circuit breakers are closed and the voltage across the circuit 4 increases above a predetermined value so that the voltmeter 14 closes its contacts 26, the time relay 16 closes its contacts 18 if the voltage remains above said predetermined value for a predetermined time. The closing of the relay contacts 18 first completes a circuit for the tripping coil 13 through contacts 27 on the circuit breaker 7 so that the circuit breaker 7 is opened and the capacitor 3 is disconnected from the circuit 4.

If the circuit voltage is still too high after the capacitor 3 is disconnected, a circuit is completed for the tripping coil 12 of the circuit breaker 9 to effect the opening of the circuit breaker and the disconnection of the capacitor 2. This circuit is from one side of a control circuit, through tripping coil 12, auxiliary contacts 29 on circuit breaker 6, auxiliary contacts 30 on the circuit breaker 7, contacts 18 of relay 16 to the other side of the control circuit.

If the contacts 18 of relay 16 are closed when only the circuit breaker 5 is closed, a circuit is completed for the tripping coil 11 to effect the opening of the circuit breaker 5 and the disconnection of the capacitor 1. This circuit is from one side of a control circuit through tripping coil 11, auxiliary contacts 31 on circuit breaker 5, auxiliary contacts 32 on circuit breaker 6, auxiliary contacts 30 on circuit breaker 7, contacts 18 of relay 16 to the other side of the control circuit.

It will be observed that if a fault occurs in any one of the circuits of the capacitors while it is in service, the overload relay associated therewith operates and effects the disconnection of the faulty capacitor, locks out the associated circuit breaker, and transfers the control to the next circuit breaker as through the locked-out circuit breaker were closed.

It will be observed that the arrangement is such that the number of capacitors connected to the circuit 4 is automatically varied so that the voltage across the circuit 4 remains constant. While I have shown and described an arrangement for controlling the connections between a circuit and three capacitors it is obvious that my invention is not limited to such an arrangement, but may be used to control successively the connections between a circuit and any number of capacitors.

While I have in accordance with the patent statutes shown and described my invention as applied to a particular system and as embodying various devices diagrammatically indicated, changes and modifications will be obvious to those skilled in the art, and I, therefore, aim in the appended claims to cover all such changes and modifications as fall within the true spirit and scope of my invention.

What I claim as new and desire to secure by Letters Patent of the United States is:

1. In combination, an electric circuit, a plurality of capacitors, means responsive to an electrical condition of said circuit for effecting the connection of said capacitors to said circuit in a predetermined sequence, and overload responsive means associated with certain of said capacitors for effecting the disconnection thereof from said circuit and for rendering the next circuit breaker in said sequence operative to be closed by said first mentioned means.

2. In combination, an electric circuit, a plurality of capacitors, a circuit breaker associated with each capacitor for connecting it to said circuit, a relay responsive to a predetermined electrical condition of said circuit, means normally arranged to effect the closing of said circuit breaker in a predetermined sequence comprising closing means for each of certain of said circuit breakers arranged to be operated when said relay is in a predetermined position and a predetermined circuit breaker in said sequence is closed, and overload responsive means associated with certain of said capacitors for effecting the disconnection thereof and for rendering the closing means of the next circuit breaker operative.

3. In combination, an electric circuit, a plurality of capacitors, a switch associated with each capacitor for controlling the connection thereof to the electric circuit, and means for effecting the operation of said switches in a predetermined sequence comprising a control circuit for each switch, contacts in each control circuit, control means responsive to a predetermined condition of said electric circuit for controlling certain of the contacts in each control circuit, and means dependent upon the position of a switch for controlling certain of the contacts in the control circuit of next succeeding switch in said predetermined sequence; and means responsive to a predetermined abnormal condition of a capacitor for removing the associated control circuit from the control of said control means and for placing the control circuit of next succeeding switch under the control of said control means independently of the contacts controlled by the position of the switch associated with the faulty capacitor.

4. In combination, an electric circuit, a plurality of capacitors, a switch associated with each capacitor for controlling the connection thereof to the electric circuit, and means for effecting the operation of said switches in a predetermined sequence comprising a control circuit for each switch, contacts in each control circuit, control means responsive to a predetermined condition of said electric circuit for controlling certain of the contacts in each control circuit, and means dependent upon the position of a switch for controlling certain of the contacts in the control circuit of the succeeding switch in said predetermined sequence; and means responsive to a predetermined abnormal current in a capacitor for opening certain of the contacts in the control circuit of the associated switch and for closing contacts in a shunt circuit around the contacts in the control circuit of the succeeding switch in said sequence which are normally controlled by the switch associated with the faulty capacitor.

5. In combination, an electric circuit, a plurality of reactive means, a circuit breaker associated with each reactive means for connecting it to said circuit, means responsive to an electrical condition of said circuit for effecting the closing of said circuit breakers in a predetermined sequence and overload responsive means associated with certain of said reactive means for effecting the disconnection thereof from said circuit and for rendering the next circuit breaker in said sequence operative to be closed by said first mentioned means.

In witness whereof, I have hereunto set my hand this 13th day of January, 1927.

ARVID E. ANDERSON.